United States Patent
Okada et al.

[11] Patent Number: 6,015,349
[45] Date of Patent: Jan. 18, 2000

[54] POWER TRANSMISSION MECHANISM FOR COMPRESSORS

[75] Inventors: Masahiko Okada; Takashi Ban; Tatsuya Hirose; Kiyoshi Yagi; Tatsuyuki Hoshino; Hidefumi Mori; Takanori Okabe; Nobuaki Hoshino, all of Kariya, Japan

[73] Assignee: Kabushiki Kaisha Toyoda Jidoshokki Seisakusho, Aichi-ken, Japan

[21] Appl. No.: 09/079,667

[22] Filed: May 15, 1998

[30] Foreign Application Priority Data

May 16, 1997 [JP] Japan ................................ 9-127325

[51] Int. Cl.[7] .......................... F16D 19/00; F16D 27/00; F16D 37/02
[52] U.S. Cl. .............................................. 464/31; 417/223
[58] Field of Search .......................... 192/55.3, 56.1, 192/56.2, 82 T, 209, 150, 84.941; 464/31, 40.87, 57; 417/222.2, 223

[56] References Cited

U.S. PATENT DOCUMENTS

| 5,036,964 | 8/1991 | Booth et al. ........................... 192/84 C |
| 5,380,161 | 1/1995 | Takenaka et al. .................... 417/222.2 |
| 5,391,058 | 2/1995 | Goto et al. ............................... 417/223 |
| 5,620,372 | 4/1997 | Takada et al. ............................ 464/40 |

FOREIGN PATENT DOCUMENTS

| 8-121332 | 5/1996 | Japan . |
| 8-121336 | 5/1996 | Japan . |
| 8-247164 | 9/1996 | Japan . |
| 8-277847 | 10/1996 | Japan . |

*Primary Examiner*—Rodney H. Bonck
*Assistant Examiner*—Tisha D. Waddell
*Attorney, Agent, or Firm*—Morgan & Finnegan, L.L.P.

[57] ABSTRACT

A compressor mounted on a vehicle is disclosed. The compressor includes an apparatus for transmitting rotational power from an engine to drive shaft of the compressor via a pulley. The apparatus has a spring coupled to one of the pulley and the drive shaft. A deformable ring is coupled to the other one of the pulley and the drive shaft. The deformable ring is deformed by heat. The spring and the deformable ring are being held in abutment against each other by the force of the spring so as to transmit the rotational power to each other. A contact ring is interposed between the spring and the deformable ring. The contact ring has a rigidity larger than that of the deformable ring. The spring and the contact ring frictionally contact one another to generate the heat that deform the deformable ring when load generated in the drive shaft is in excess of a predetermined value.

27 Claims, 9 Drawing Sheets

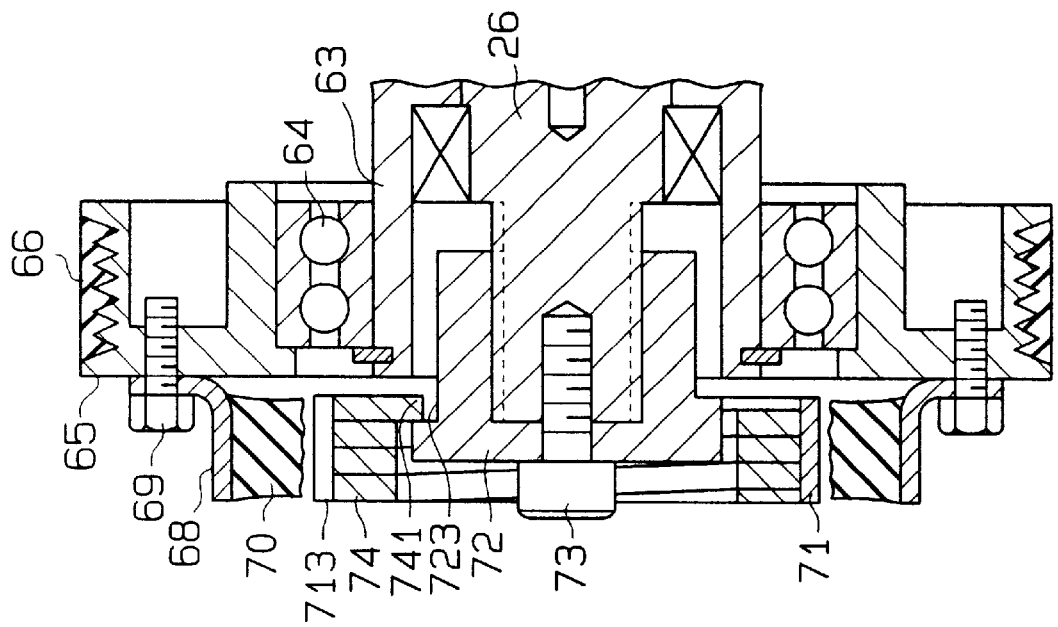
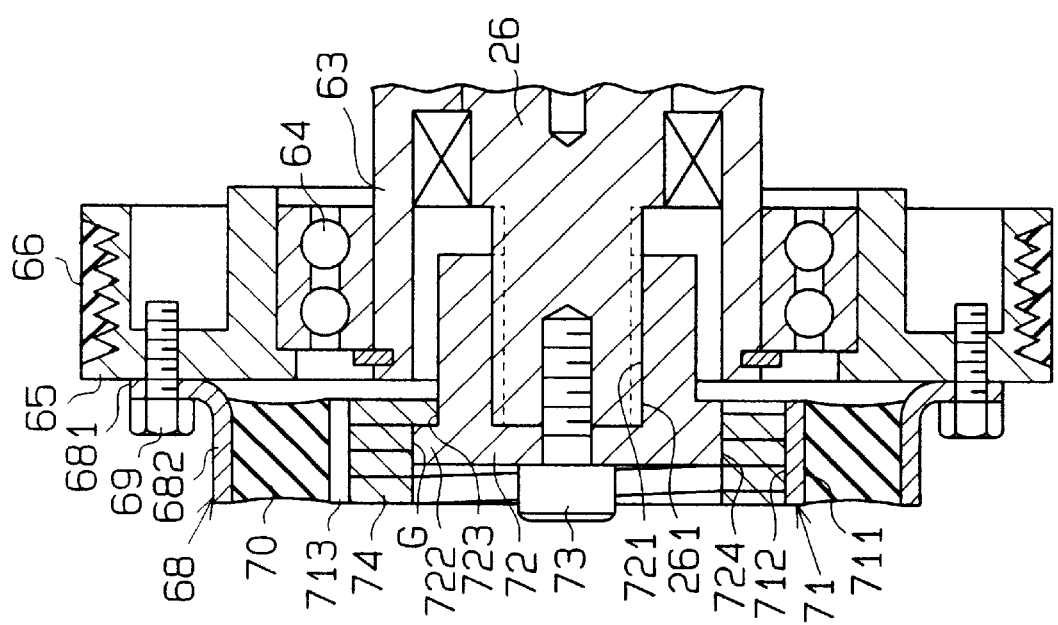

POWER TRANSMISSION MECHANISM FOR COMPRESSORS

BACKGROUND OF THE INVENTION

The present invention relates to power transmission mechanisms for compressors, and more particularly, to a device for disconnecting a compressor from its power source if an excessive load acts on the compressor.

Japanese Unexamined Patent Publication No. 8-277847 describes a typical power transmission mechanism. As shown in FIG. 11, the power transmission mechanism includes a first rotating element 81, a second rotating element 82, and a coil spring 83. The second rotating element 82 is coaxial with the first rotating element 81. The coil spring 83 has an end engaged with the first rotating element 81 and is wound around the second rotating element 82. The second rotating element 82 has a cylindrical shaft 84 and a friction layer 85. The friction layer 85 is made of resin or the like and applied to the surface of the shaft 84. The outer surface of the friction layer 85 is in contact with the inner surface of the coil spring 83. When the load applied to the second rotating element 82 exceeds a predetermined level, the torque of the first rotating element 81 causes slippage between the coil spring 83 and the friction layer 85. The slippage produces friction heat that softens or deforms the friction layer 85 thereby reducing the radial size of the second rotating element 82 at the portion contacting the coil spring 83. In such state, the transmission of power (torque) between the first and second rotating elements 81, 82 is cut off.

The coil spring 83 is produced with each of its windings having different dimensions. Since the inner surface of the coil spring 83 directly contacts the outer surface of the friction layer 85, the force of the coil spring 83 that torsionally grips the second rotating element 82 differs at each winding. Therefore, the level of the load that releases the second rotating element 82 differs between adjacent windings of the coil spring 83. The coil spring 83 is normally made of a highly rigid and highly resilient material such as steel, while the friction layer 85 is made of a relatively low hardness material such as resin or rubber. Thus, the contact area between the coil spring 83 and the friction layer 85 and the tightening force of the coil spring 83 differs at each winding of the coil spring 83. As a result, when torque is applied to the first rotating element 81, the level of the load acting on the second rotating element 82 that causes the coil spring 83 to release the second rotating element 82 may differ from the desirable level. This becomes more problematic as the dimensional precision of the coil spring 83 decreases. Hence, it is difficult to obtain a predictable power cut-off characteristic.

In addition, when the compressor initiates operation, sludge or liquefied refrigerant may produce a heavy load for only a short period of time. However, this initial load may soften or melt the friction layer 85 and unnecessarily cut off the power.

Furthermore, the same problem may also occur when using other types of resilient means, such as a leaf spring, in lieu of the coil spring.

SUMMARY OF THE INVENTION

Accordingly, it is an objective of the present invention to provide a power transmission mechanism that makes the tightening forces of the windings more uniform, cuts off power at each winding at substantially the same load level, and prevents unnecessary power cut-off when the load is temporarily excessive.

To achieve the above objective, the present invention provides an apparatus for transmitting rotational power from a driving body to a driven body. The apparatus includes a resilient member coupled to one of the driving body and the driven body. A deformable member is coupled to the other one of the driving body and the driven body. The deformable body is deformed by heat. The resilient member and the deformable member are forcibly in abutment against each other by means of force of the resilient member so as to transmit the rotational power to each other. A contact member is interposed between the resilient member and the deformable member. The contact member has a rigidity larger than that of the deformable member. The resilient member and the contact member frictionally contact one another to generate the heat that deforms the deformable member when load generated in the driven body is in excess of a predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is an enlarged cross-sectional view showing the power transmission mechanism of FIG. 1 in a normal state;

FIG. 3 is an enlarged cross-sectional view showing the power transmission mechanism of FIG. 1 in a released state;

DETAILED DESCRIPTION OF THE PREFERRED EMBODIMENTS

A first embodiment of a power transmission mechanism according to the present invention will now be described with reference to FIGS. 1 to 5. The power transmission mechanism is employed in a clutchless variable displacement compressor.

Figure 1:
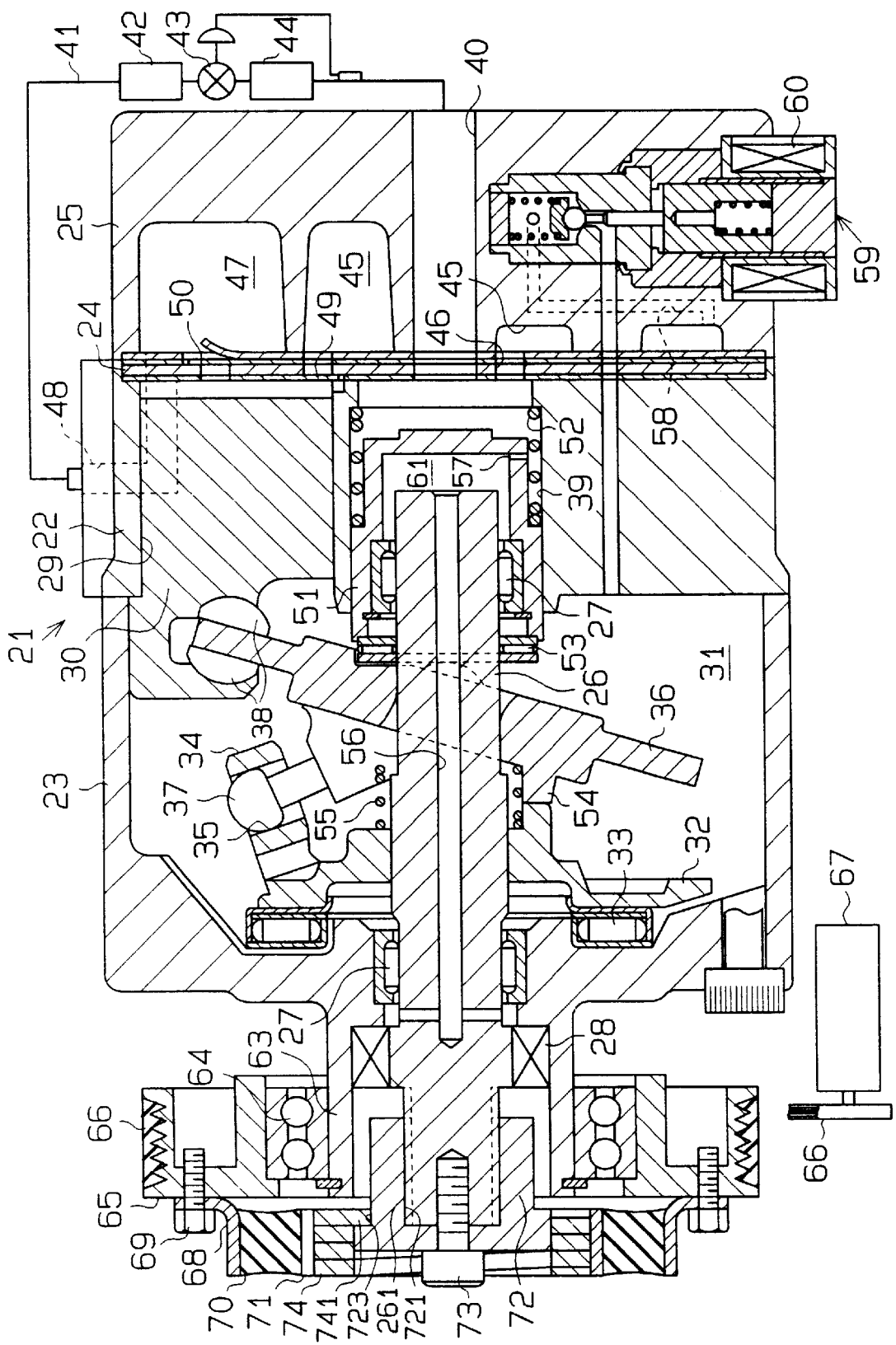
FIG. 1 is a cross-sectional drawing showing a clutchless variable displacement compressor employing a power transmission mechanism according to a first embodiment of the present invention.

As shown in FIG. 1, a compressor 21 includes a cylinder block 22, a front housing 23 coupled to the front end of the cylinder block 22, and a rear housing 25 coupled to the rear end of the cylinder block 22 by way of a valve plate 24.

A drive shaft 26 extends through the center of the cylinder block 22 and the front housing 23. The drive shaft 26 is rotatably supported by a pair of radial bearings 27. A lip seal 28 is arranged between the front end of the drive shaft 26 and the inner wall of the front housing 23.

Equally spaced cylinder bores 29 extend through the cylinder block 22 parallel to the drive shaft 26. A piston 30 is accommodated in each cylinder bore 29. A crank chamber 31 is defined in the front housing 23 in front of the cylinder block 22.

A rotor 32 is fitted on the drive shaft 26 in the crank chamber 31 so as to rotate integrally with the drive shaft 26. The rotor 32 engages the front wall of the front housing 23 by means of the thrust bearing 33. An arm 34 having a pair of guide bores 35 (only one shown in FIG. 1) projects from the rotor 32.

A generally disk-like swash plate 36 is fitted on the drive shaft 26. A pair of coupling rods 37 having round ends extend from the front surface of the swash plate 36. Each coupling rod 37 is supported pivotally and slidably in either one of the guide bores 35 to rotate the swash plate 36 integrally with the drive shaft 26 while permitting inclination of the swash plate 36 with respect to the drive shaft 26.

Each piston 30 is connected to the peripheral portion of the swash plate 36 by a pair of semispherical shoes 38. When the rotation of the drive shaft 26 rotates the swash plate 36, each piston 30 is reciprocated in the associated cylinder bore 29.

A shutter chamber 39 extends through the center of the cylinder block 22 coaxially with the drive shaft 26. A suction passage 40 extends through the center of the rear housing 25 and the valve plate 24 coaxially with the drive shaft 26. The front end of the suction passage 40 is communicated with the shutter chamber 39. The rear end of the suction passage 40 is communicated with an external refrigerant circuit 41. The external refrigerant circuit 41 includes a condenser 42, an expansion valve 43, and an evaporator 44.

An annular suction chamber 45 is defined in the central portion of the rear housing 25. The suction chamber 45 is communicated with the shutter chamber 39 through a port 46. An annular discharge chamber 47 is defined in the peripheral portion of the rear housing 25. The discharge chamber 47 is connected to the external refrigerant circuit 41 through a discharge passage 48.

A suction valve mechanism 49 and a discharge valve mechanism 50 are provided on the valve plate 24 for each cylinder bore 29. When each piston 30 moves from the top dead center position to the bottom dead center position, refrigerant gas is drawn into the cylinder bore 29 through the associated suction valve mechanism 49. The refrigerant gas is then compressed as the piston 30 moves from the bottom dead center position to the top dead center position. When the pressure of the refrigerant gas reaches a predetermined value, the refrigerant gas is discharged into the discharge chamber 47 through the associated discharge valve mechanism 50.

A cylindrical shutter 51 is accommodated in the shutter chamber 39 coaxially with the drive shaft 26. The shutter 51 moves axially in the shutter chamber 39. A spring 52 is arranged between the shutter 51 and the rear wall of the shutter chamber 39 to urge the shutter 51 toward the swash plate 36. The rear end of the drive shaft 26 is held rotatably and slidably by a radial bearing 27 in the shutter 51. A thrust bearing 53 is slidably fitted on the drive shaft 26 between the shutter 51 and the swash plate 36.

The swash plate 36 inclines with respect to the drive shaft 26 between a minimum inclination position and a maximum inclination position. When the swash plate 36 is located at the minimum inclination position, the shutter 51 is moved against the force of the spring 52 to a closing position. In this state, the shutter 51 closes the suction passage 40 and impedes the flow of refrigerant gas from the external refrigerant circuit 41 to the suction passage 45. The inclination of the swash plate 36 with respect to a plane perpendicular to the axis of the drive shaft 26 when located at the minimum inclination position is slightly greater than zero degrees. Further inclination of the swash plate 26 from the minimum inclination position is restricted when the shutter 51 reaches the closing position.

When cooling becomes unnecessary, the swash plate 36 is moved to the minimum inclination position so that the compressor 21 continues operation. Accordingly, the drive shaft 26 of the compressor 21 is always connected to the power source without using a clutch. In other words, the compressor 21 is clutchless.

When the swash plate 36 is located at the maximum inclination position, the shutter 51 is moved forward to an opening position by the force of the spring 52. This opens the suction passage 40 and permits the flow of refrigerant gas from the external refrigerant circuit 41 to the suction chamber 45 by way of the suction passage 40, the shutter chamber 39, and the port 46. In this state, the compressor displacement is maximum. Further inclination of the swash plate 26 from the maximum inclination position is restricted when a projection 54 extending from the front surface of the swash plate 36 abuts against the rotor 32.

A spring 55 is arranged on the drive shaft 26 between the rotor 32 and the swash plate 36 to urge the swash plate 36 toward the minimum inclination position.

A relief passage 56 extends through the center of the drive shaft 26. The front end of the relief passage 56 is connected to the crank chamber 31. The rear end of the relief passage 56 is connected with the interior of the shutter 51. An aperture 57 extends through the cylindrical wall of the shutter 51. The interior of the shutter 51 is connected to the shutter chamber 39 through the aperture 57. The pressure in the crank chamber 31 is communicated to the suction chamber 45 through a communication passageway 61 defined by the relief passage 56, the interior of the shutter 51, the aperture 57, the shutter chamber 39, and the port 46.

A pressurizing passage 58 extends through the rear housing 25, the valve plate 24, and the cylinder block 22 to connect the discharge chamber 47 to the crank chamber 31. An electromagnetic valve 59 having a solenoid 60 is arranged along the pressurizing passage 58 in the rear housing 25. The solenoid 60 is excited to close the electromagnetic valve 59 and de-excited to open the electromagnetic valve 59. When the electromagnetic valve 59 is opened, the pressure of the discharge chamber 47 is communicated to the crank chamber 31 through the pressurizing passage 58. This adjusts the pressure in the crank chamber 31.

Pressure Pc acts on the crank chamber side of the pistons 30, while pressure Ps, or the pressure in the cylinder bores 29, acts on the head side of the pistons 30. The difference between pressure Pc and Ps is represented as ΔPcs. The pressure difference ΔPcs, the forces of the springs 52, 55, and the moment acting about the ends of the coupling rods 37 (as viewed in FIG. 1) determine the inclination of the swash plate 36. When the electromagnetic valve 59 is opened, refrigerant gas flows into the crank chamber 31 through the pressurizing passage 58 from the discharge chamber 47. This increases the pressure difference ΔPcs and applies a moment acting on the swash plate 36 about the coupling rods 37 in a counterclockwise direction (as viewed in FIG. 1). Subsequently, the swash plate 36 moves toward the minimum inclination position thereby decreasing the compressor displacement.

A neck 63 is formed integrally with the front housing 23 and coaxially with the drive shaft 26. An angular bearing 64 is fitted on the neck 64. A pulley 65 is secured to the outer race of the angular bearing 64. The pulley 65 is arranged coaxially with the drive shaft 26 and connected to the power source, or engine 67, by a belt 66.

As shown in FIGS. 1 and 2, a generally annular bracket 68 is fastened to the front side of the pulley 65 by a plurality of bolts 69. The bracket 68 includes a flange 681, which is fixed to the pulley 65, and a cylinder 682, which is integral with the flange 681. A deformable ring 70 is adhered to the inner surface of the cylinder 682. The deformable ring 70 is softened, melted, or deformed when the temperature of the ring 70 exceeds a predetermined value. A tubular contact element 71, which is made of a metal, such as steel or aluminum alloy, and which has greater rigidity than the deformable ring 70, is adhered to the inner surface of the deformable ring 70.

A synthetic resin such as glass fiber, carbon fiber, talc, polyphenylene sulfide (PPS) containing inorganic matter such as clay, polyether ether ketone (PEEK), polyamide, polyimide, or epoxy resin is used to form the deformable ring 70. Vulcanization is performed to adhere the outer surface of the deformable ring 70 to the cylinder 682 of the bracket 68 and the inner surface of the deformable ring 70 to the outer surface 711 of the contact element 71.

A slit 713 extends axially through the contact element 71. The slit 713 permits the contact element 71 to enlarge when the transmission of power is cut off.

A splined shaft 261 is defined at the front end of the drive shaft 26. A cup-like bushing 72 is fitted on the splined shaft 261 and fastened to the drive shaft 26 by a lock bolt 73. The bushing 72 includes a flange 722, which is formed integrally with the bushing 72, and a slot 723. Keyways 721 extend along the inner surface of the bushing 72 to receive the splines of the splined shaft 261.

A limit spring 74 is arranged between the bushing 72 and the contact element 71. The limit spring 74 is a coiled strand made of a material such as spring steel. The rear end of the limit spring 74 is bent inward to form a hook 741. The hook 741 is received by the slot 723, which is located at the rear of the flange 722. This fixes the limit spring 74 to the bushing 72 and restricts relative rotation between the limit spring 74 and the pulley 65. Furthermore, the engagement between the hook 741 and the slot 723 prevents the limit spring 74 from moving axially forward.

Figure 4:
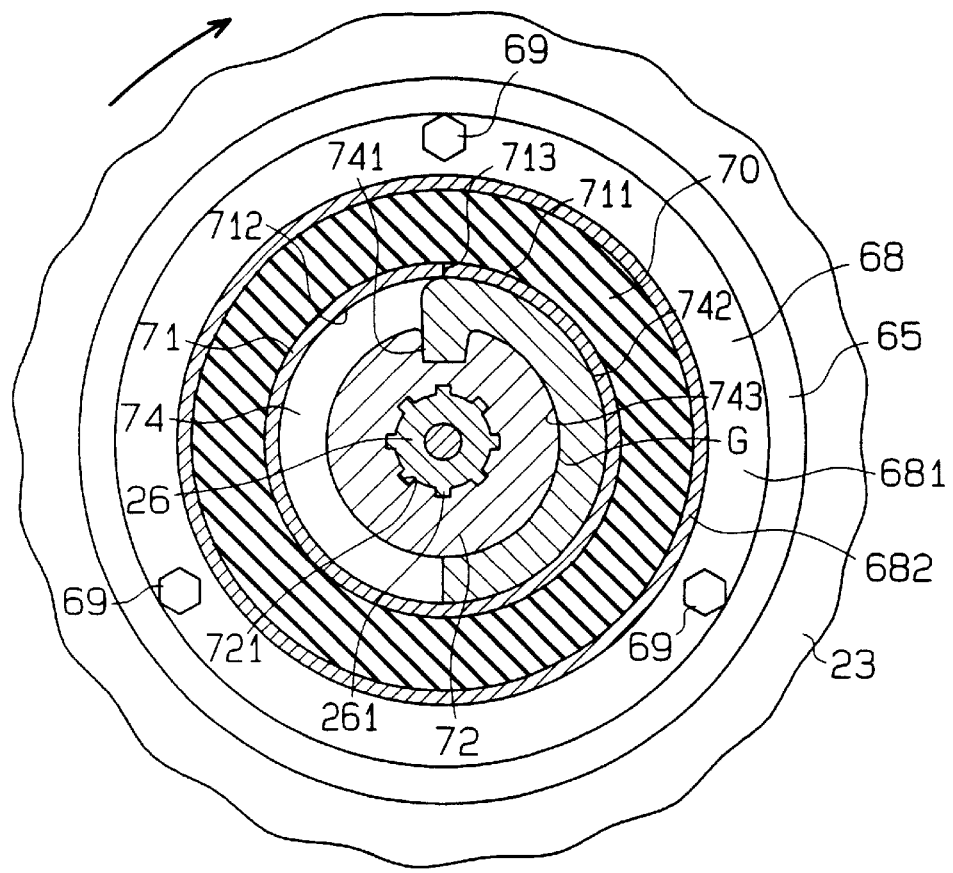
FIG. 4 is a front cross-sectional view showing the power transmission mechanism.
Figure 5:
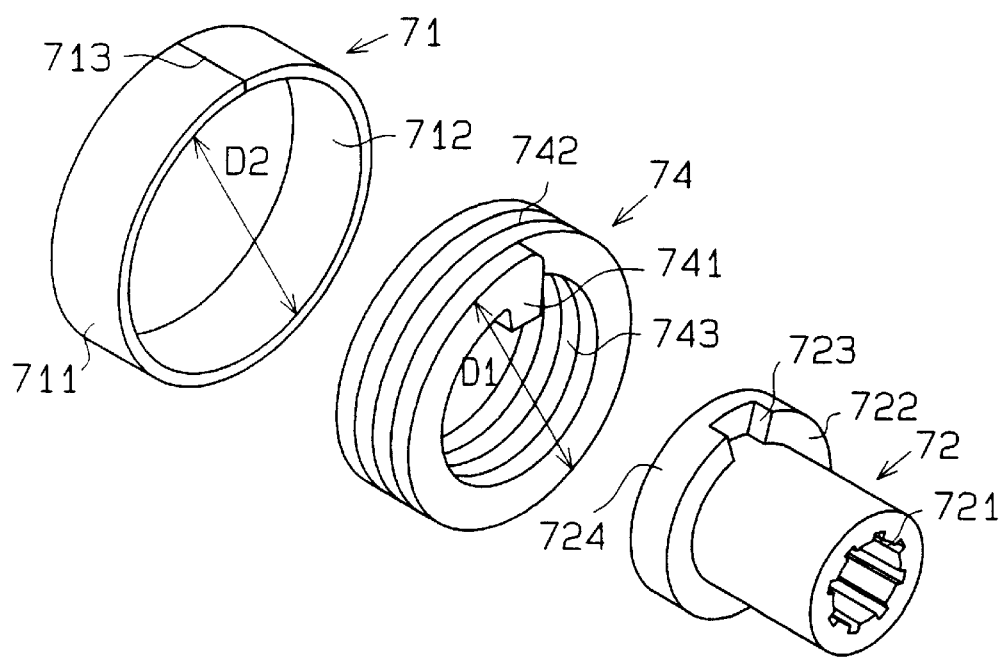
FIG. 5 is an exploded perspective view showing a bushing, a limit spring, and a contact element.

The limit spring 74 has an outer surface 742 and an inner surface 743 (FIG. 5). The outer surface 742 is pressed against the inner surface 712 of the contact element 71. As shown in FIGS. 2 and 4, a slight gap G is provided between the inner surface 743 at the rear portion of the limit spring 74 and the outer surface 724 of the bushing flange 722.

When the limit spring 74 is unloaded, that is, when external force is not applied to the limit spring 74, the outer diameter D1 of the limit spring 74 is larger than the inner diameter D2 of the contact element 71.

The limit spring 74 is assembled to the compressor 21 as described below.

The limit spring 74 is first twisted and radially constricted. The limit spring 74 is then inserted into the contact element 71. In this state, the bracket 68, the deformable ring 70, and the contact element 71 are not yet secured to the pulley 65. The force twisting the limit spring 74 is then released. This radially expands the limit spring 74 and abuts the outer surface 742 of the limit spring 74 against the inner surface 712 of the contact element 71. The torsional force of the limit spring 74 thus causes the spring's outer surface 742 to press against the inner surface 712 of the contact element 71 with a predetermined force.

The bracket 68 is then fastened to the pulley 65 by the bolts 69. The bushing 72 is fitted on the splined shaft 261 of the drive shaft 26 so that the slot 723 in the flange 722 receives the hook 741 of the limit spring 74. Finally, the bushing 72 is fastened to the splined shaft 261 by the lock bolt 73.

As shown in FIGS. 1 and 2, under normal operating conditions, the power of the engine 67 is transmitted to the drive shaft 26 of the compressor 21 by means of the belt 66, the pulley 65, the bracket 68, the deformable ring 70, the contact element 71, the limit spring 74, and the bushing 72.

FIG. 4 is a front view showing the pulley 65 and the drive shaft 26. When the pulley 65 is rotated in the direction of the arrow, the limit spring 74 is rotated in the same direction from the hook 741. During operation of the compressor, compression load, which is produced by the compression of refrigerant gas, constantly acts on the drive shaft 26. When an abnormality such as seizure or the compression of liquefied refrigerant occurs, an excessive load acts on the drive shaft 26 and the bushing 72 in a direction opposite the rotating direction of the pulley 65. Thus, the contact element 71 is rotated relative to the outer surface 742 of the limit spring 74. Since the hook 741 at the rear end of the limit spring 74 is engaged with the bushing 72, the contact element 71 moves relative to the hook 741 in a direction opposite to the arrow. This causes torsional deformation of the limit spring 74 starting from the hook 741. The torsional deformation slightly constricts the limit spring 74 in the radial direction. This reduces the force of the limit spring 74 that presses the outer surface 742 of the limit spring 74 against the inner surface 712 of the contact element 71. As a result, slippage occurs between the contact element 71 and the limit spring 74.

The operation of the compressor 21 will now be described.

In the state shown in FIG. 1, the solenoid 60 is excited to close the electromagnetic valve 59. This closes the pressurizing passage 58. Thus, the high pressure refrigerant gas in the discharge chamber 47 is not delivered to the crank chamber 31 through the pressurizing passage 58. The refrigerant gas in the crank chamber 31 enters the suction chamber 45 through the communication passageway 61. Accordingly, the crank chamber pressure Pc approaches the suction chamber pressure Ps. This decreases the pressure difference ΔPcs and shifts the swash plate 36 to the maximum inclination position and maximizes the compressor displacement.

When the cooling load falls as the compressor continues maximum displacement operation, the temperature of the evaporator 44 in the external refrigerant circuit 41 gradually decreases. When the temperature falls to a value at which frost starts to form, the solenoid 60 is de-excited to open the electromagnetic valve 59. This permits the high pressure refrigerant gas in the discharge chamber 47 to flow into the crank chamber 31 through the pressurizing passage 58 and increase the crank chamber pressure Pc. As a result, the pressure difference ΔPcs increases and shifts the swash plate 36 from the maximum inclination position toward the minimum inclination position.

As the inclination of the swash plate 36 decreases, the thrust bearing 53 moves the shutter 51 against the urging force of the spring 52 to the rear and toward the closing position. When the shutter 51 reaches the closing position, the rear end of the shutter 51 abuts against the wall about the opening of the suction passage 40. Thus, the shutter 51 closes the suction passage 40 and impedes the flow of refrigerant gas from the external refrigerant circuit 41 to the suction chamber 45.

The minimum inclination of the swash plate 36 is slightly greater than zero degrees (as measured from a plane perpendicular to the drive shaft 26). Therefore, when the swash plate 36 is located at the minimum inclination position, refrigerant gas is continuously discharged into the discharge chamber 47 from the cylinder bores 29 and the compressor is operated in a minimum displacement state. The gas in the discharge chamber 47 flows into the crank chamber 31 through the pressurizing passage 58. The gas then flows through the communication passageway 61 into the suction chamber 45 to be drawn into the cylinder bores 29 again. In other words, an internal refrigerant circuit is formed in the compressor 21 when the swash plate 36 is located at the minimum inclination position.

When the need for cooling increases as the compressor continues minimum displacement operation, the temperature of the evaporator 44 in the external refrigerant circuit 41 gradually increases. When the temperature exceeds a predetermined value, the solenoid 60 is excited to close the electromagnetic valve 59. This stops the high pressure refrigerant gas in the discharge chamber 47 from flowing into the crank chamber 31 through the pressurizing passage 58. However, the refrigerant gas in the crank chamber 31 flows into the suction chamber 45 through the communication passageway 61. This gradually decreases the pressure in the crank chamber 31. As a result, the pressure difference ΔPcs decreases and shifts the swash plate 36 from the minimum inclination position toward the maximum inclination position.

As the inclination of the swash plate 36 increases, the force of the spring 52 moves the shutter 51 forward and separates the rear end of the shutter 51 from the wall about the opening of the suction passage 40. Thus, the shutter 51 opens the suction passage 40 and commences the flow of refrigerant gas from the external refrigerant circuit 41 to the suction chamber 45. When the swash plate 36 reaches the maximum inclination position, the compressor displacement is maximum.

The compressor 21 stops operation when the engine 67 is stopped. In such state, the electromagnetic valve 59 is opened and the swash plate 36 is held at the minimum inclination position.

The operation of the power transmission mechanism will now be described.

Under normal conditions, the power of the engine 67 is transmitted to the drive shaft 26 by way of the belt 66, the pulley 65, the bracket 68, the deformable ring 70, the contact element 71, the limit spring 74, and the bushing 72.

During the transmission of power to the compressor 21, a load acting in a direction opposite the rotating direction of the pulley 65 (as indicated by the arrow in FIG. 4) is applied to the drive shaft 26, and its magnitude depends on the operating conditions of the compressor. The load torsionally deforms the limit spring 74 so as to radially constrict the spring 74. A very high load reduces the force of the limit spring 74 that presses the outer surface 742 of the limit spring 74 against the inner surface 712 of the contact element 71 and causes slippage. However, if the magnitude of the load is lower than a predetermined level, slippage does not occur between the outer surface 742 of the limit spring 74 and the inner surface 712 of the contact element 71. Thus, the outer surface 742 of the limit spring 74 normally remains in contact with the inner surface 712 of the contact element 71. Accordingly, power transmission between the pulley 65 and the drive shaft 26 continues under normal operating conditions.

When an abnormality in the compressor 21 produces excessive load, slippage occurs between the outer surface 742 of the limit spring 74 and the inner surface 712 of the contact element 71. That is, the excessive load, which acts in the counterclockwise direction, as viewed in FIG. 4, moves the hook 741 in the same direction and torsionally deforms the limit spring 74. Although the limit spring 74 remains in contact with the contact element 71, a slight radial constriction of the limit spring 72 takes place. This causes slippage of the limit spring 74 with respect to the contact element 71 and produces friction heat as the two metals slide against each other. The heat is transmitted through the contact element 71 and softens or melts the deformable ring 70. Subsequently, the limit spring 74 expands radially. This enlarges the diameter of the contact element 71 and widens the slit 713 thereby pushing the softened or melted portion of the deformable ring 70 outward, as shown in FIG. 3. Consequently, the inner diameter D2 of the contact element 71 becomes substantially the same as the outer diameter D1 of the limit spring 74. In such state, the limit spring 72 and the contact element 71 are substantially free from the pulley 65. Thus, the transmission of power to the limit spring 72 is cut off, as shown in FIG. 3.

The advantages described below are obtained in this embodiment.

The limit spring 74 is engaged with the flange 722 of the bushing 72, which is fixed to the drive shaft 26. The outer surface 742 of the limit spring 74 is pressed against the inner surface 712 of the contact element 71. This structure makes the force applied to the inner surface of the deformable ring 70 relatively uniform in comparison to when the limit spring 74 directly applies force directly to the deformable ring 70. The contact element 71 applies uniform pressure on the deformable ring 70 even if the limit spring 74 does not have a uniform radial dimension. Accordingly, the load level that causes slippage between the inner surface 712 of the contact element 71 and the outer surface 742 of the limit spring 74 is predictable and constant from one winding to another.

The contact element 71 between the outer surface 742 of the limit spring 74 and the inner surface of the deformable ring 70 prevents deformation of the deformable ring 70 when temporary compression of liquefied refrigerant causes temporary heat friction and slippage. Accordingly, unnecessary power cut-off is prevented.

The hook 741 located at the rear end of the limit spring 74 is received in the slot 723 formed in the flange 722 of the bushing 72, which is fixed to the drive shaft 26. This structure facilitates the engagement of the flange 722 with respect to the limit spring 74 when assembling the compressor. Furthermore, a slight gap G is provided between the inner surface 743 of the limit spring 74 and the outer surface 724 of the bushing flange 722. This facilitates the insertion of the bushing 72 into the limit spring 74.

In this embodiment, the contact element 71 is constructed by forming the slit 713 in a tubular material to permit radial enlargement. This simple structure reduces the number of parts and facilitates production of the compressor.

When assembled to the power transmission mechanism, the bushing 72 securely holds the hook 741 of the limit spring 74 in the slot 723. Thus, the limit spring 74 is prevented from falling out of the power transmission mechanism when the limit spring 74 is enlarged during torque transmission.

The hook 741 provided on one end of the limit spring 74 is secured to the drive shaft 26. The limit spring 74 is helically wound in the same direction as the rotating direction of the pulley 65 from the hook 741. In addition, the outer surface 742 of the limit spring 74 is pressed against the inner surface 712 of the contact element 71. Therefore, when an excessive force acts on the drive shaft 26, constriction of the limit spring 74 takes place starting from the hook 741. This smoothly reduces the force of the limit spring 74 that is applied to the inner surface 712 of the contact element 71. Furthermore, the force of the limit spring 74 is made uniform by the contact element 71.

A second embodiment of a power transmission mechanism according to the present invention will now be described with reference to FIG. 6. In this embodiment, the structure of the limit spring 74 and the structure for coupling the limit spring 74 to the drive shaft 26 differs from that of the first embodiment.

Figure 6:
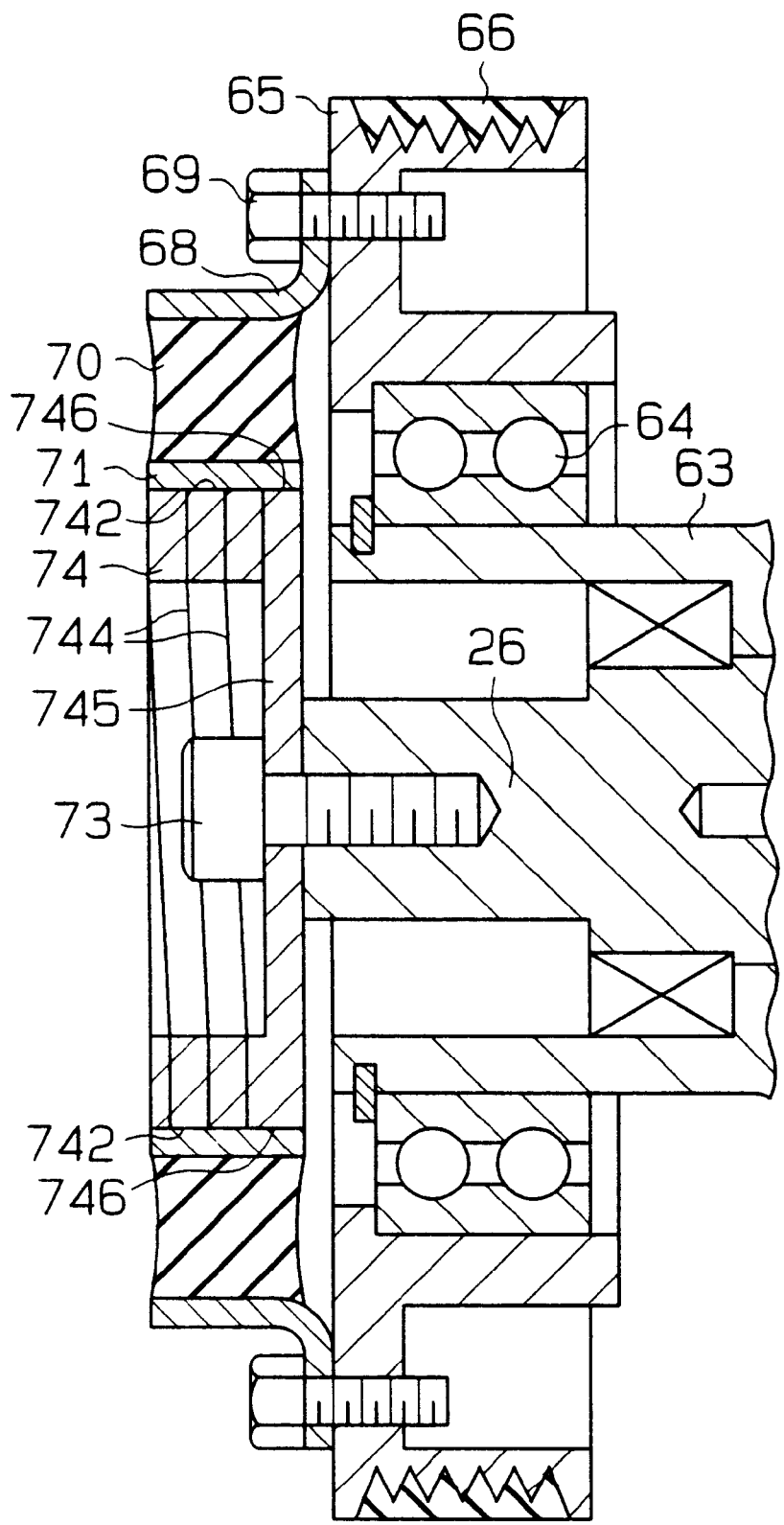
FIG. 6 is a cross-sectional view showing a second embodiment of a power transmission mechanism according to the present invention.

As shown in FIG. 6, a slit 744 is spirally cut into a cup-like material to form a coiled limit spring 74. The limit spring 74 has an end wall 745, the center of which is fastened to the drive shaft 26 by a lock bolt 73. A locking structure (not shown) is provided to restrict relative rotation between the limit spring 74 and the drive shaft 26. The end wall 745 has a periphery 746. The periphery 746 cannot be constricted. Accordingly, the outer surface 742, excluding the periphery 746, is formed to have a diameter greater than that of the end wall periphery 746. The outer surface 742 is constricted when fitting the limit spring 74 into the contact element 71.

In addition to the advantages obtained in the first embodiment, the advantages described below are also obtained in this embodiment.

In this embodiment, the bushing 72 is eliminated from the power transmission mechanism. This reduces the number of parts, simplifies the structure of the power transmission mechanism, and lightens the power transmission mechanism.

The limit spring 74 is formed by cutting a slit 744 into a cylindrical cup. This facilitates production of the limit spring 74 and improves the dimensional precision of the outer surface 742 of the limit spring 74. Accordingly, the contact state between the limit spring 74 and the contact element 71 is optimized. This makes the load level that cuts off power transmission predictable and constant.

Figure 7:
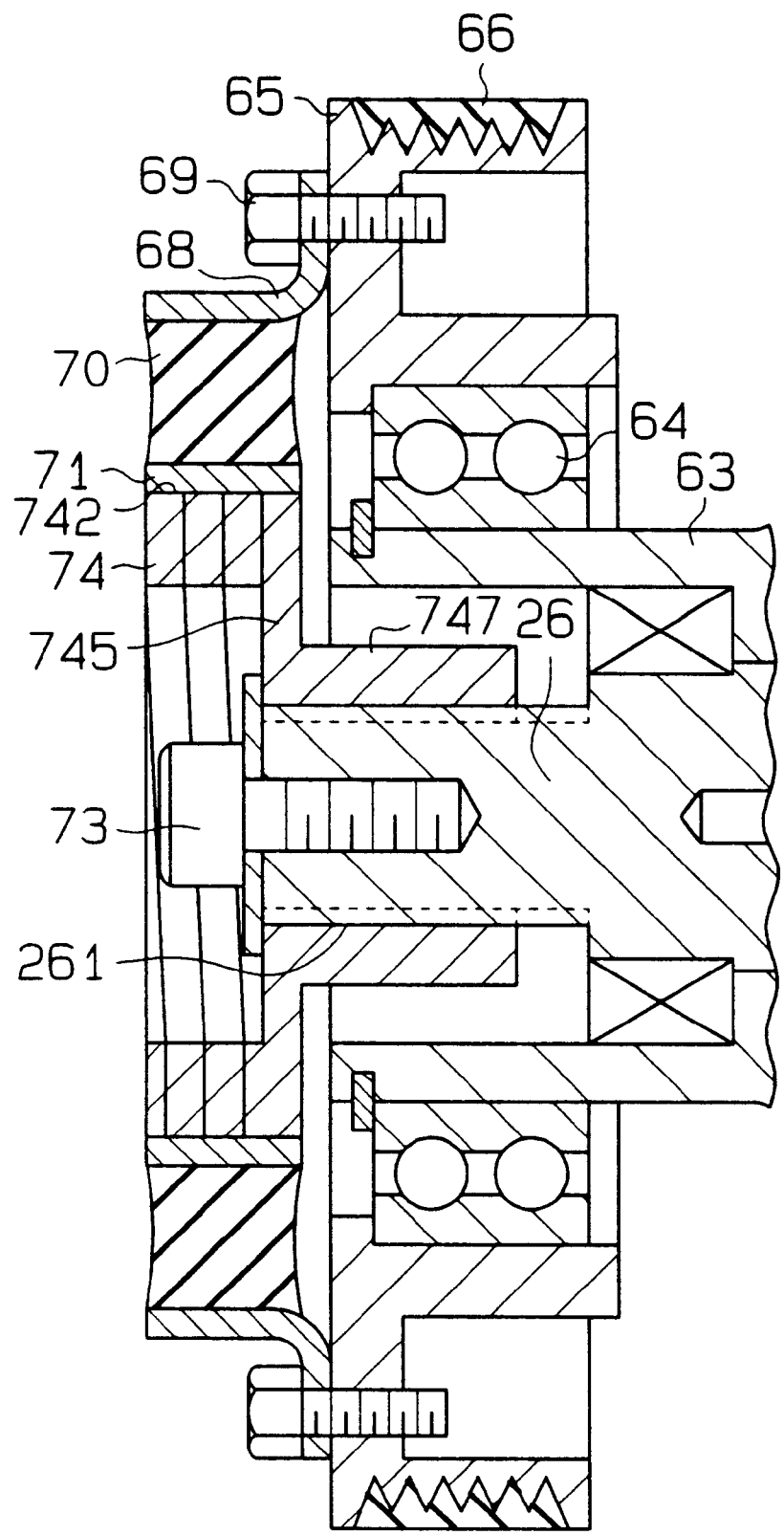
FIG. 7 is a cross-sectional view showing a third embodiment of a power transmission mechanism according to the present invention.

A third embodiment of a power transmission mechanism according to the present invention is shown in FIG. 7. The third embodiment is a modification of the second embodiment. As shown in the drawing, a bushing 747 having keyways extends integrally from the end wall 745 of the limit spring 74.

In addition to the advantages obtained in the second embodiment, the limit spring 74 may easily be coupled to the splined shaft 261 extending from the drive shaft 26.

A fourth embodiment of a power transmission mechanism according to the present invention will now be described with reference to FIGS. 8 and 9.

In this embodiment, the arrangement of the deformable ring 70, the contact element 71, and the limit spring 74 is reversed from the structure of the first, second, and third embodiments. As shown in FIG. 8, a bushing 72 having an flange 722 and an outer cylinder 725, which extends integrally from the flange 722, is fastened to the drive shaft 26 by a lock bolt 73. The outer cylinder 725 is adhered to the inner surface of the deformable ring 70. The outer surface of the deformable ring 70 is adhered to the inner surface of the contact element 71. An annular groove 651 extends through the pulley 65. The rear portion of the limit spring 74 is fitted into and fixed to the groove 651. The front portion of the limit spring 74 is fitted on the contact element 71 such that the inner surface 743 of the limit spring 74 presses the outer surface 711 of the contact element 71.

Figure 8:
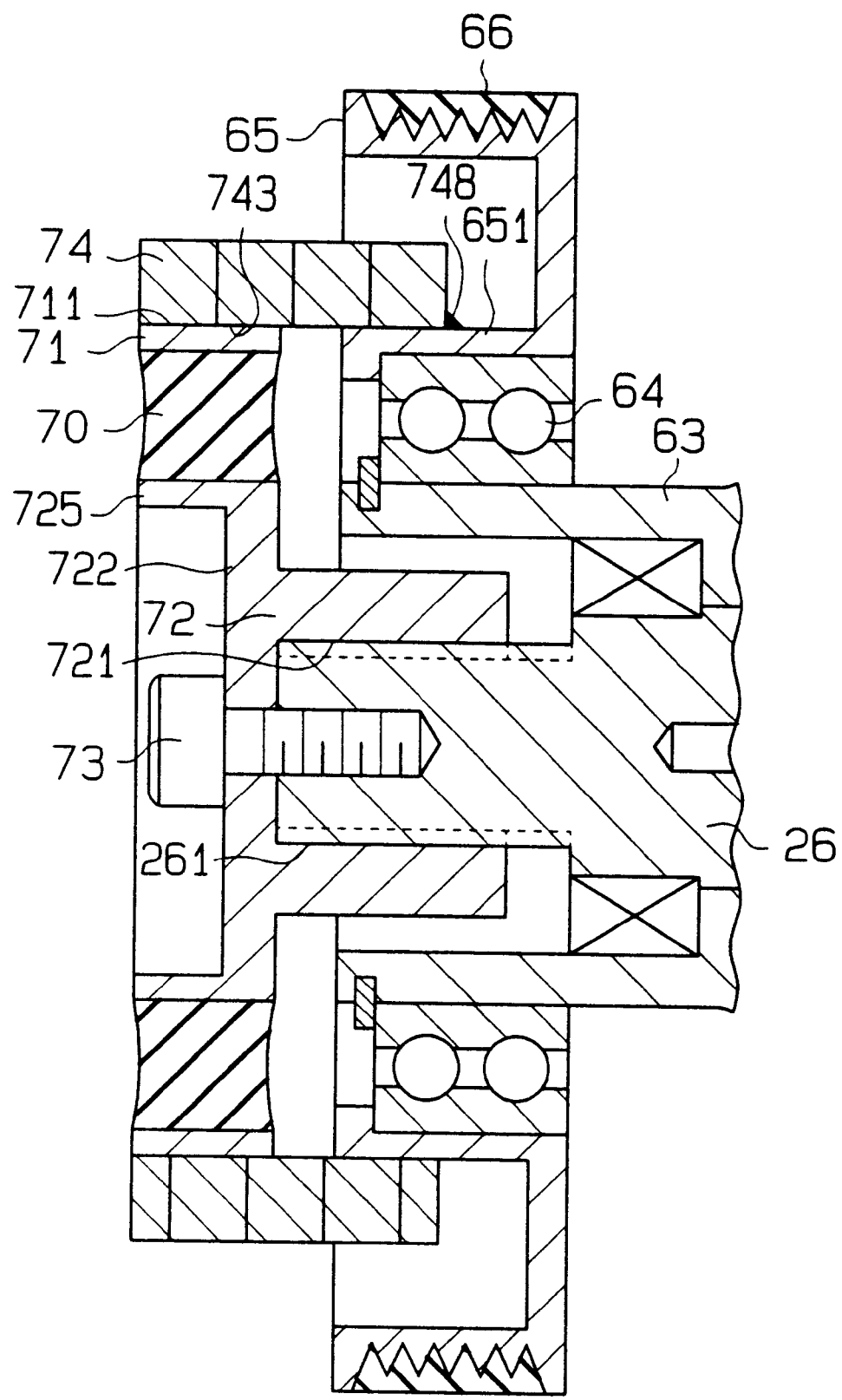
FIG. 8 is a cross-sectional view showing a fourth embodiment of a power transmission mechanism according to the present invention.
Figure 9:
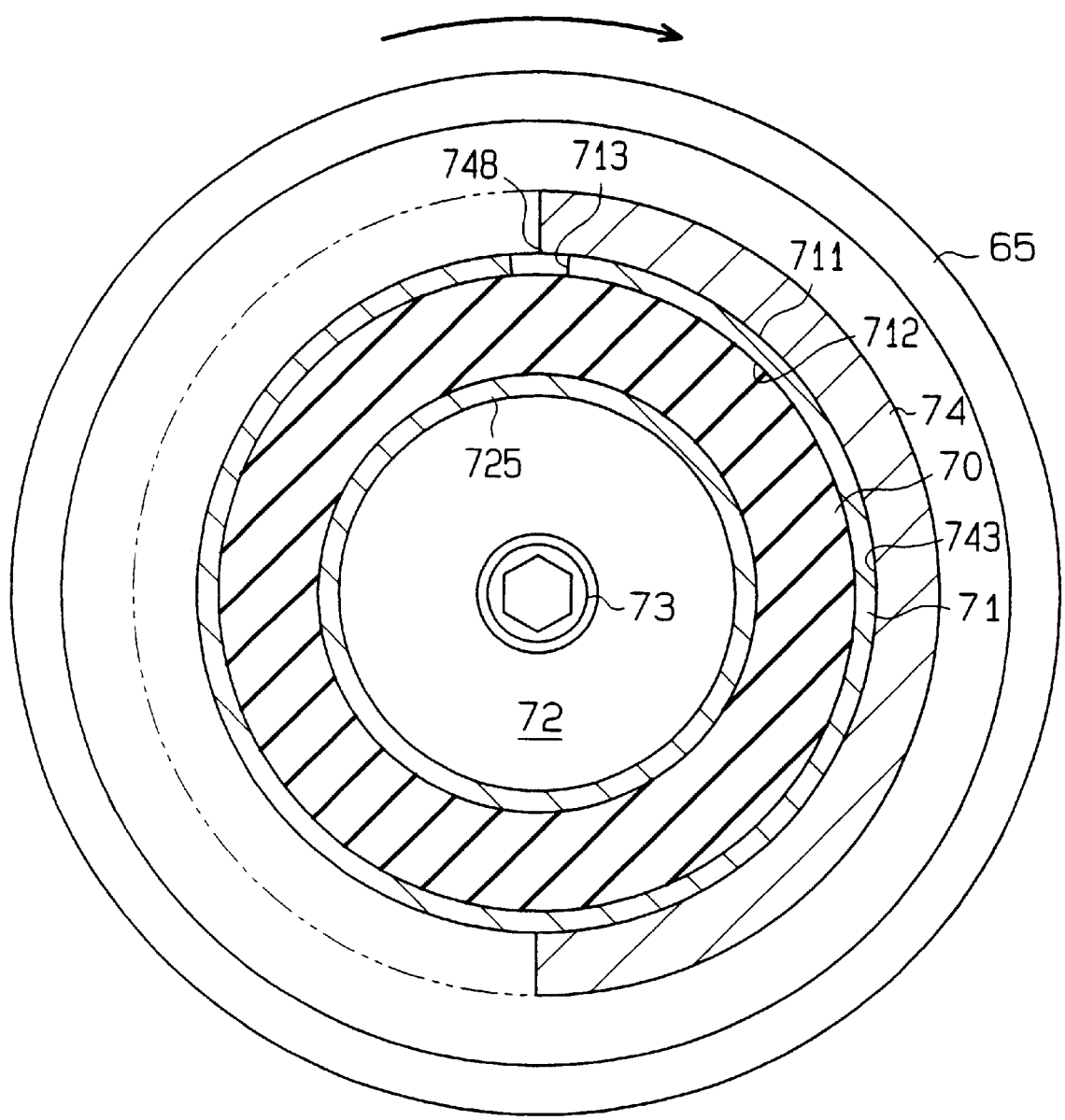
FIG. 9 is a cross-sectional view showing the power transmission mechanism of FIG. 8.

The rear end of the limit spring 74 is coupled to the groove 651 of the pulley 65 (for example, by welding 748), as shown in FIG. 8. The limit spring 74 is wound from the coupling point in the same direction as the rotating direction of the pulley 65 (as shown by the arrow in FIG. 9). Therefore, when a load acts on the drive shaft 26 in a direction opposite the pulley rotating direction, the contact element 71 radially expands the limit spring 74. This causes slippage between the outer surface 711 of the contact element 71 and the inner surface 743 of the limit spring 74 and produces friction heat. The heat is transmitted from the contact element 71 to the deformable ring 70 thereby softening or melting the deformable ring 70. Subsequently, the force of the limit spring 74 constricts the contact element 71 toward the deformable ring 70 thereby cutting off power transmission.

In addition to the advantages obtained in the first embodiment, the advantage described below may be obtained in the fourth embodiment.

The contact area between the limit spring 74 and the contact element 71 is greater than the contact area between the contact element 71 and the deformable ring 70. This enhances the softening or deformation of the deformable ring 70 that is caused by friction heat.

Figure 10:
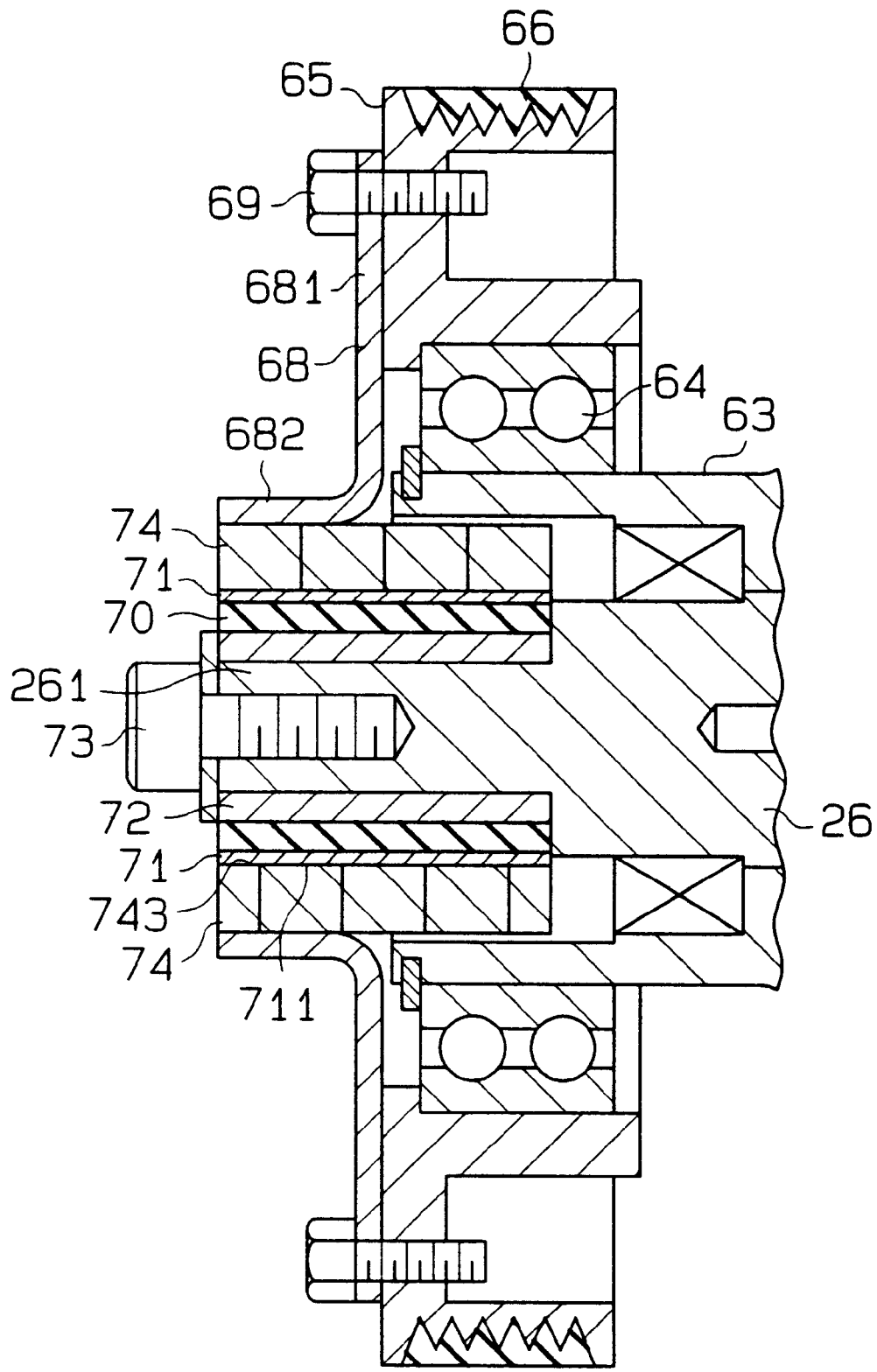
FIG. 10 is a cross-sectional view showing a fifth embodiment of a power transmission mechanism according to the present invention.
Figure 11:
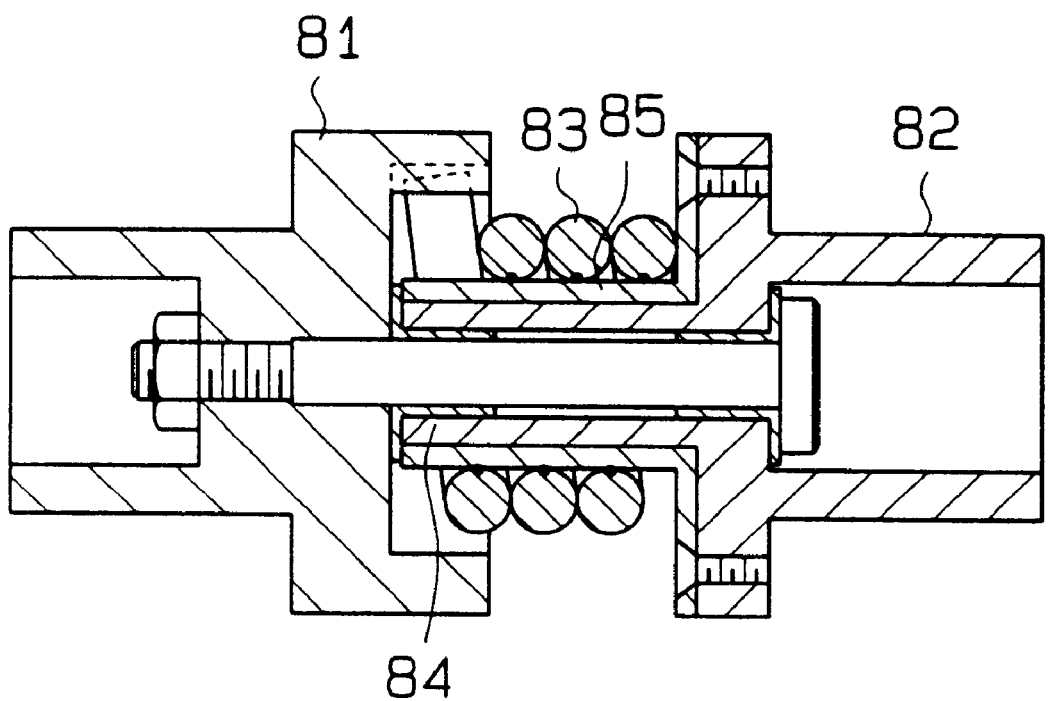
FIG. 11 is a cross-sectional view showing a prior art power transmission mechanism.

A fifth embodiment of a power transmission mechanism according to the present invention will now be described with reference to FIG. 10. The structure of the power transmission mechanism is basically the same as that of the fifth embodiment. As shown in FIG. 10, the bracket 68 extends from the pulley 65 to the vicinity of the drive shaft 26. The front portion of the limit spring 74 is fitted in the cylinder 682 of the bracket 68. A bushing 72 having keyways is fitted to the splined shaft 261 extending from the drive shaft 26 such that the keyways receive the splines of the splined shaft 261. The bushing 72 is then locked to the drive shaft 26 by a lock bolt 73. The outer surface of the bushing 72 is adhered to the inner surface of the cylindrical deformable ring 70. The outer surface of the deformable ring 70 is adhered to the inner surface of the contact element 71. The inner surface 743 of the limit spring 74 is pressed against the outer surface 711 of the contact element 71.

In addition to the advantages obtained in the first embodiment, the advantage described below are obtained in the fifth embodiment.

The bushing 72, the deformable ring 70, the contact element 71, and the limit spring 74 are arranged near the splined shaft 261 extending from the drive shaft 26. This reduces the size of the power transmission mechanism.

It should be apparent to those skilled in the art that the present invention may be embodied in many other specific forms without departing from the spirit or scope of the invention. More particularly, the present invention may be embodied as described below.

In the first, second, and third embodiments, the contact element 71 is provided with the slit 713 such that the contact element 71 can be enlarged. The slit 713 need not be straight and may be inclined with respect to the axis of the contact element 71. Furthermore, more than one slit 713 may be provided.

In any one of the above embodiments, the limit spring (coil spring) 74 may be replaced by other resilient means such as a washer spring, a leaf spring, or a rod spring.

In any one of the above embodiments, an annular ring that functions in the same manner as the deformable ring 70 may be connected to the pulley 65. In this case, an annular contact element that can be enlarged is fit into the annular ring. A resilient member connected to the drive shaft 26 is then fitted into the annular contact element such that the resilient member is pressed against the annular contact element.

In any one of the above embodiments, an annular ring that functions in the same manner as the deformable ring 70 may be connected to the drive shaft 26. In this case, an annular contact element that can be enlarged is fitted on the annular ring. A resilient member connected to the pulley 65 is then fitted into the annular contact element such that the resilient member is pressed against the pulley 65.

Therefore, the present examples and embodiments are to be considered as illustrative and not restrictive and the invention is not to be limited to the details given herein, but may be modified within the scope and equivalence of the appended claims.

What is claimed is:

1. An apparatus for transmitting rotational power from a driving body to a driven body, said apparatus comprising:

a resilient member coupled to one of the driving body and the driven body;

a deformable member coupled to the other one of the driving body and the driven body, said deformable member being deformable by heat; and a contact member interposed between the resilient member and the deformable member, said contact member having a rigidity greater than that of the deformable member, said resilient member and said contact member being in forcible abutment with each other by means of force exerted by the resilient member, said deformable member and said contact member being in abutment with each other, and said resilient member and said contact member frictionally contacting one another to generate the heat that deforms the deformable member when load generated in the driven body is in excess of a predetermined value.

2. The apparatus as set forth in claim 1, wherein said deformable member includes a deformable ring coupled to the driving body, wherein said contact member includes contact ring fitted within the deformable member, said contact ring having a diameter increasable based on the resilient member fitted within the contact ring.

3. The apparatus as set forth in claim 2, wherein said contact ring has a slit allowing the diameter of the contact ring increasable.

4. The apparatus as set forth in claim 1, wherein said deformable member includes a deformable ring coupled to the driving body, wherein said contact member includes contact ring fitted on an outer periphery of the deformable member, said contacting ring having a diameter reducible based on the resilient member fitted within the contact ring.

5. The apparatus as set forth in claim 4, wherein said contact ring has a slit allowing the diameter of the contact ring reducible.

6. The apparatus as set forth in claim 1, wherein said resilient member includes a spring.

7. The apparatus as set forth in claim 6, wherein said spring includes a torsion coil spring that is torsionally deformed in accordance with the load applied to the driven body to increase pressing force acting on one of an inner peripheral surface and an outer peripheral surface.

8. The apparatus as set forth in claim 7, wherein said torsion coil spring and said contact ring are in contact with each other with lubricant therebetween.

9. The apparatus as set forth in claim 8, wherein said driven body includes a rotary shaft and a bushing mounted on the rotary shaft, and wherein said bushing has a flange portion to which the torsion coil spring is attached.

10. The apparatus as set forth in claim 9, wherein said torsion coil spring has a projection at its end and wherein said bushing has a recess that receives the projection.

11. A compressor mounted on a vehicle, said compressor including an apparatus for transmitting rotational power from an engine to a drive shaft of the compressor via a pulley, said apparatus comprising:

a spring coupled to one of the pulley and the drive shaft;

a deformable ring coupled to the other one of the pulley and the drive shaft, said deformable ring being made of one of a synthetic resin and a rubber and being deformable by heat; and a contact ring interposed between the spring and the deformable ring, said contact ring having a rigidity greater than that of the deformable ring, said spring and said contact ring being in forcible abutment with each other by means of force exerted by the spring, said deformable ring and said contact ring being in abutment with each other, and said spring and said contact ring frictionally contacting one another to generate the heat that deforms the deformable ring when load generated in the drive shaft is in excess of a predetermined value.

12. The apparatus as set forth in claim 11, wherein said contact ring is fitted within the deformable ring, and wherein said contact ring has a diameter increasable based on the spring fitted within the contact ring.

13. The apparatus as set forth in claim 12, wherein said contact ring has a slit allowing the diameter of the contact ring increasable.

14. The apparatus as set forth in claim 11, wherein said contact ring is fitted on an outer periphery of the deformable ring, and wherein said contacting ring has a diameter reducible based on the spring fitted within the contact ring.

15. The apparatus as set forth in claim 14, wherein said contact ring has a slit allowing the diameter of the contact ring reducible.

16. The apparatus as set forth in claim 15, wherein said spring includes a torsion coil spring that is torsionally deformed in accordance with the load applied to the drive shaft to increase pressing force acting on one of an inner peripheral surface and an outer peripheral surface of the contact ring.

17. The apparatus as set forth in claim 16, wherein said torsion coil spring and said contact ring are in contact with each other with lubricant therebetween.

18. The apparatus as set forth in claim 17, further comprising a bushing mounted on the drive shaft, and wherein said bushing has a flange portion to which the torsion coil spring is attached.

19. The apparatus as set forth in claim 18, wherein said torsion coil spring has a projection at its end and wherein said bushing has a recess that receives the projection.

20. A compressor mounted on a vehicle, said compressor including an apparatus for transmitting rotational power from an engine to a drive shaft of the compressor via a pulley, said apparatus comprising:

a spring coupled to one of the pulley and the drive shaft;

a deformable ring coupled to the other one of the pulley and the drive shaft, said deformable ring being made of one of a synthetic resin and a rubber and being deformable by heat; and a contact ring interposed between the spring and the deformable ring, said contact ring having a rigidity greater than that of the deformable ring, said spring and said contact ring being in forcible abutment with each other by means of force exerted by the spring, said deformable ring and said contact ring being in abutment with each other, said contact ring having a diameter that is variable based on the force exerted by said spring, said contact ring having a slit allowing the diameter of the contact ring to be varied, and said spring and said contact ring frictionally contacting one another to generate the heat that deforms the deformable ring when load generated in the drive shaft is in excess of a predetermined value.

21. The apparatus as set forth in claim 20, wherein said spring includes a torsion coil spring that is torsionally deformed in accordance with the load applied to the drive shaft to increase pressing force acting on one of an inner peripheral surface and an outer peripheral surface of the contact ring.

22. The apparatus as set forth in claim 21, wherein said torsion coil spring and said contact ring are in contact with each other with lubricant therebetween.

23. The apparatus as set forth in claim 22, further comprising a bushing mounted on the drive shaft, and wherein said bushing has a flange portion to which the torsion coil spring is attached.

24. The apparatus as set forth in claim 23, wherein said torsion coil spring has a projection at its end and wherein said bushing has a recess that receives the projection.

25. The apparatus as set forth in claim 1, wherein said rigidity and said variable diameter of said contact member causes the force applied by the contact member to the deformable ring to be relatively uniform even if said resilient member does not have a uniform radial dimension.

26. The apparatus as set forth in claim 11, wherein said rigidity and said variable diameter of said contact ring causes the force applied by the contact member to the deformable ring to be relatively uniform even if said spring does not have a uniform radial dimension.

27. The apparatus as set forth in claim 20, wherein said rigidity and said variable diameter of said contact ring causes the force applied to the deformable ring to be relatively uniform even if said spring does not have a uniform radial dimension.

* * * * *